June 25, 1940.  I. PETERSON  2,205,490
HYDRAULIC SHOVEL
Filed Aug. 16, 1939  2 Sheets-Sheet 1
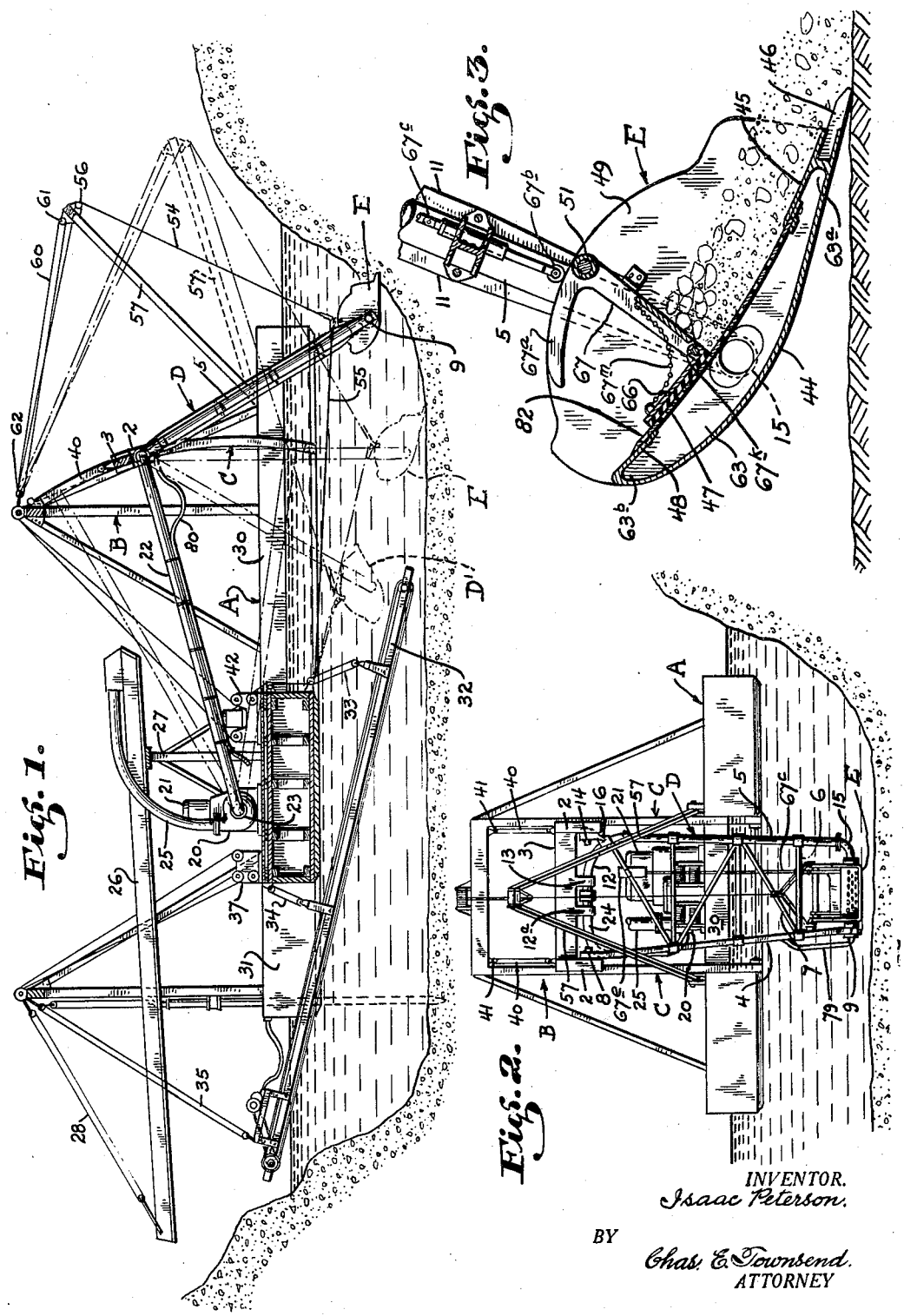
INVENTOR.
Isaac Peterson.
BY
Chas. E. Townsend.
ATTORNEY June 25, 1940.  I. PETERSON  2,205,490
HYDRAULIC SHOVEL
Filed Aug. 16, 1939   2 Sheets-Sheet 2
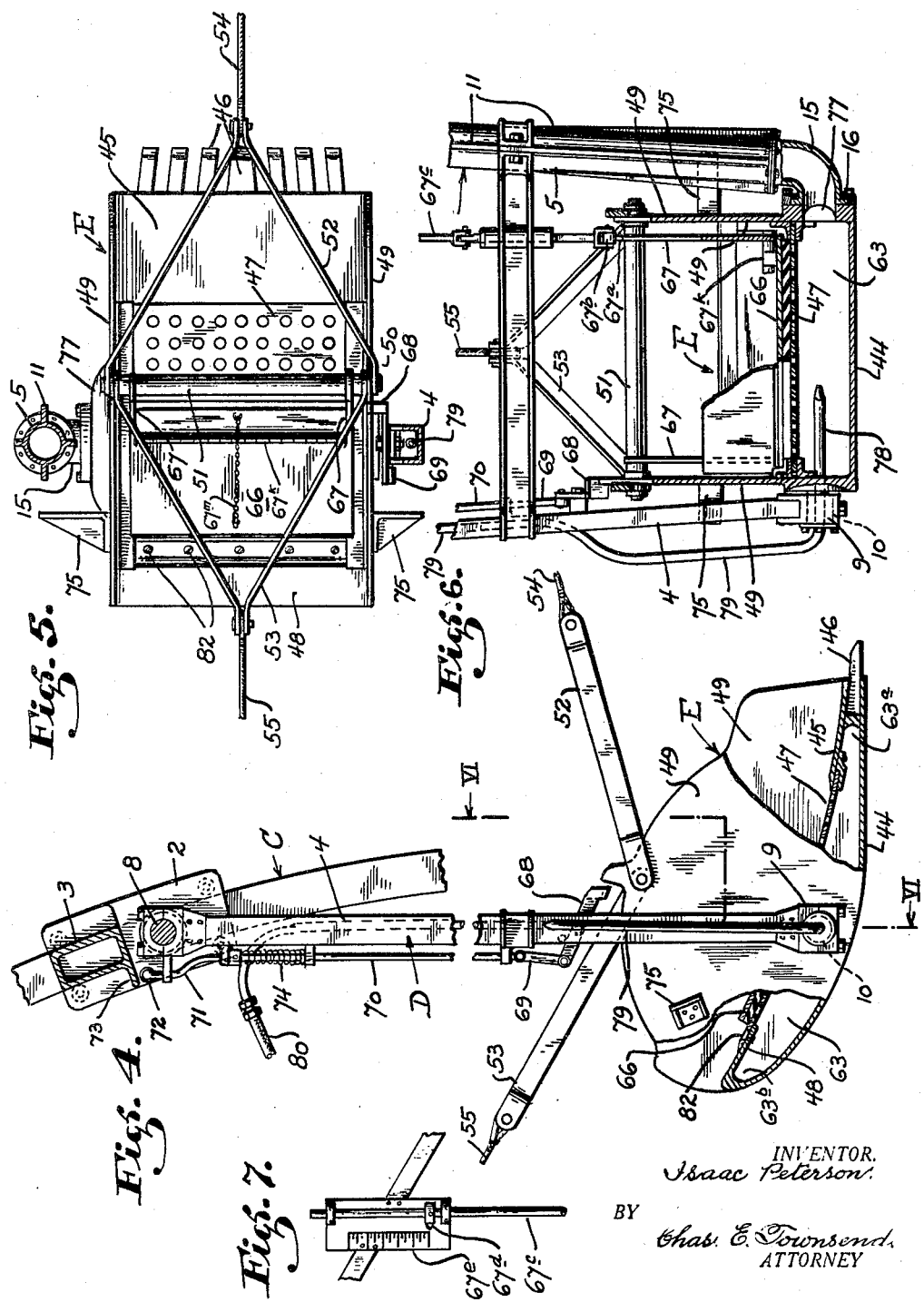
INVENTOR.
Isaac Peterson.
BY
Chas. E. Townsend,
ATTORNEY Patented June 25, 1940

2,205,490

UNITED STATES PATENT OFFICE 2,205,490

HYDRAULIC SHOVEL

Isaac Peterson, Oakland, Calif.

Application August 16, 1939, Serial No. 290,443

14 Claims (Cl. 37—57)

This invention relates to a hydraulic shovel dredge and particularly to a shovel of the character described in which water flow through a shovel is maintained by a centrifugal suction pump.

The object of the present invention is generally to improve and simplify the construction and operation of a hydraulic shovel dredge; to provide a shovel dredge which is adapted to float on a river or pond and in which the shovel when working remains submerged below the surface of the water; to provide a shovel from which the sand and gravel, together with the minerals contained, are continuously removed by a liberal flow of water through the shovel and thereafter elevated to an overhead sluice or similar apparatus for the recovery of the minerals; to provide a shovel which not only functions to dig the gravel but also to screen the same so that the sluice and elevating means are relieved of all coarse material; to provide means on the shovel for collecting the coarse gravel and large rocks and for periodically dumping the same; to provide a submerged conveyor for receiving and removing the coarse rock and gravel to a point behind the dredge; to provide means operable from the dredge for tilting the shovel to assume different angular positions when digging and dumping; to provide a shovel having a removable screen and in conjunction therewith a pivoted adjustable shutter to automatically reduce the suction area presented by the screen, and similarly to automatically enlarge said area as working conditions may demand; to provide a centrifugal suction type pump for maintaining a heavy suction within the shovel below the screen to insure an ample flow of water through the gravel deposited on the screen, and to elevate material passing through the screen to an overhead sluice; to provide a booster nozzle supplying water under pressure for directing material entering the shovel into the suction pipe, and to automatically prime said suction pipe in case the suction is broken; and further to provide an articulated suction pipe between the shovel and the suction side on the pump which permits free operation of the shovel and at the same time permits a minimum suction head to be maintained during most working conditions of the shovel.

The invention is shown by way of illustration in the accompanying drawings, in which Fig. 1 is a side elevation of the dredge, said view being partially in section;

Fig. 2 is a front view of the dredge;

Fig. 3 is an enlarged central vertical cross section of the dredge shovel;

Fig. 4 is a side elevation of the shovel and swinging front, said view being partially in section;

Fig. 5 is a plane view of the shovel with the frame supporting the same in section;

Fig. 6 is a cross section taken on line VI—VI of Fig. 4; and

Fig. 7 is an enlarged view of an indicator.

Referring to the drawings in detail, and particularly to Figs. 1 and 2, A indicates a dredge barge or pontoon of suitable construction. Disposed near one end thereof is a gallows frame B, and extending forwardly and downwardly therefrom are a pair of arcuate track members C on each of which is slidably mounted an arcuate shoe 2. Secured between the shoes is a cross beam 3, and suspended from the cross beam and the shoes is a swinging frame D, at the lower end of which is mounted a shovel E.

The frame D is composed of two arms indicated at 4 and 5 which are connected by cross and angle braces 6 and 7 to form a rigid frame. The arm 4 is formed of a steel beam which is channel shaped in cross section. Its upper end is journaled as at 8 to an adjacent shoe 2, while the lower end terminates in a bearing 9 in which is journaled a hollow stud pin 10 secured to one side of the shovel (see Fig. 6). This pin forms a pivotal support for one side of the shovel, the other side being somewhat similarly supported, as will hereinafter be described.

The opposite arm 5 of the frame is formed of steel pipe or heavy tubing and is reinforced longitudinally from end to end by steel plates forming ribs 11 to give the pipe the required rigidity. The upper end of the pipe is bent as at 12 to form as large a curve as possible, and it is pivotally supported by two journals indicated at 13 and 14. The journal 14 is formed by a bracket 16 welded or otherwise secured to the pipe and pivoted as at 14 to the adjacent shoe 2. The journal 13 is a bearing bracket secured to the cross beam 3. The bearings or journals 13, 14, and 8 are placed in alignment and in a common plane, thus permitting a free pivotal and swinging movement of the frame D with relation to the shoe 2 and cross beam 3. The lower end of pipe 5 terminates in an elbow 15, and a swivel connection 16 of suitable construction is made between the elbow and shovel to permit free pivotal movement of the shovel between the lower ends of the frame arms D or, in other words, the beam 4 and pipe 5.

Mounted at any point on the barge is a centrifugal pump 20. This pump may be suitably driven from any source of power, or as here shown, may be directly connected with a gas engine or motor 21. Extending from the suction side of the pump is a pipe 22. One end of the pipe has a swivel connection 23 with the pump and the other end has a swivel connection not only with relation to the cross beam 3 but also with relation to the upper curved end of the pipe 5. The upper end of the suction pipe 22 also terminates in a large curve such as shown at 24 and it is supported in a bearing 12a carried by the cross beam. Between the bearings 13 and 12a is a coupling of any suitable character into which both of the pipes extend. Hence there is a swivel connection at both ends of the pipe 22 and there is a swivel connection between the upper end of the pipe 5 and the upper end of the pipe 22, and similarly there is a swivel connection between the lower end of the pipe 5 and the shovel E. The discharge side of the pump is connected with a pipe 25, and this discharges into a sluice box 26 supported at one end by a cross frame 27 disposed on the barge, and at the opposite end by a rope and tackle such as indicated at 28 to permit the slope or grade of the sluice to be adjusted to suit the character of the mineral being recovered.

A well 30 is formed at the forward end of the dredge and a smaller well 31 at the rear end. The swinging frame D operates in the well 30. This well must accordingly be of considerable length as the swinging movement of the frame D is such that the shovel can be extended forwardly of the dredge or retracted to the dumping position indicated in dotted lines at D'. At this point coarse rock and gravel may be dumped on a submerged tailing conveyor 32 which is suspended by block and tackle 33 below the dredge. The rear end of this tailing conveyor passes upwardly through the well 31 and is supported by tackles as at 34 and 35, all of the tackles being adjustable so that the incline of the conveyor may be varied and so that it may be raised and lowered to suit varying depths. Suffice it to say that coarse rock and gravel dumped on the conveyor is carried to the rear and dumped. The several blocks and tackles indicated at 28, 34, and 35 may be operated from winch drums such as indicated at 37, or they may be hand operated if so desired.

The swinging frame D, as previously described, is suspended from the shoes 2 and the cross beam 3 and, as the depth at which the shovel operates will vary in accordance with the ground formation, it becomes essential to raise the cross beam and shoes or to lower the same from time to time. To accomplish this, cables are attached to opposite ends of the beam 3 as indicated at 40. These cables pass over sheaves 41 mounted in the gallows frame and are then carried rearwardly to a pair of winch drums 42 so that the cross beam, the shoes, and the swinging frame suspended therefrom may be raised or lowered. Inasmuch as the suction pipe 22 is connected with the upper end of the pipe 5 and the pipe 22 swivels about the connection 23 of the pump 20, the outer end of the pipe 22 must swing in an arc. It is for this reason that the arcuate track members C are provided. Thus when the cables 40 are pulled in by the winch drums 42, the cross beam 3, the shoes 2, the swinging frame carrying the shovel E, and the suction pipe 22 will be raised in unison and will similarly be lowered when the direction of the winch drums is reversed. This makes an exceedingly simple and easily operated control and permits the shovel to be quickly raised or lowered according to the depth encountered. Furthermore, the action is smoother and uninterrupted and the structure provided is more than sufficiently rigid to withstand the shocks and stresses imposed thereon.

The shovel proper is best illustrated in Figs. 3 to 6 inclusive. It consists of a bottom plate 44 curved longitudinally as shown. The front end is provided with a spacer plate 45, between which and the bottom plate is secured a plurality of digging teeth 46. The rear edge of the plate 45 forms a partial cover and retainer for a screen plate 47, the rear end of which is supported by a plate 48 forming an extension of the rear end of the bottom plate 44. The shovel is closed on opposite sides by side plates 49 welded or similarly secured to form a rigid structure. The side plates are extended a considerable distance above the screen 47, and are connected by a cross bar 51. Secured to the cross rod are a pair of bridles 52 and 53, and connected therewith are operating cables 54 and 55. The cable 54 extends over a sheave 56 secured at the upper end to a pivotally mounted boom arm 57. The cable is then extended over sheaves carried by the gallows frame and finally attached to one of the drums indicated at 42 on the main winch. By hauling the cable inwardly or winding it on the winch, the shovel will be pulled forwardly into the bank or into digging position as shown in Fig. 1. Conversely, by hauling on the cable 55 which is also connected with one of the winch drums, the shovel is swung rearwardly and will from time to time assume the dotted line position indicated by dotted lines at D' when accumulated large rock and gravel is to be dumped on the tailing conveyor 32. The boom arm 57 is supported by cables 60 passing over sheaves 61 and 62, and the free end of the cable passes to one of the winch drums 42 so that the boom arm may be raised or lowered, as shown in Fig. 1, to suit varying digging conditions.

By referring to Fig. 3, it will be noted that a chamber 63 is formed in the shovel below the screen 47, and that this chamber is in direct communication with the suction elbow 15 secured on the lower end of the pipe 5. As this is the case, there will be a continuous flow of water through the screen into the chamber and from the chamber upwardly through the pipe 5 to the pump which, in turn, discharges it through pipe 25 into the sluice. If the shovel is being slowly advanced into a bank, as shown in Fig. 3, gravel and coarse rocks will pile up on the screen and will tend to block off the perforations in the screen. The suction is, however, more than sufficient to maintain an ample flow of water through the rock and gravel, thus washing and screening it so that all material below a certain size will be pulled through the meshes of the screen into the chamber 63 and then removed and elevated through the pipes previously described. In Fig. 3, it is clearly shown that the screen 47 presents an arcuate surface and that a rubber covered shutter 66 is free to swing over the surface of the screen. That is, the shutter 66 is carried by a pair of arms 67 journaled on the cross rod 51. This shutter is gravity actuated under normal conditions and will shut off a large portion of the perforated area presented by the screen. This is desirable, as it forces the water passing through the screen to pass through that portion covered by the gravel. If the entire screen area was open, the water would be diverted and might have a tendency to channel. Furthermore, the gravel would not be washed to the extent that it is when the shutter 66 is employed. Again, as the shovel advances into a bank and the finer material is washed out of the gravel deposited on the screen, rock alone will be left and this will be pushed rearwardly, causing the shutter 66 to gradually move rearwardly until the entire screen is uncovered. At that time, the screen is loaded with large rock and coarse gravel and should be dumped, and that is accomplished by hauling in on the cable 55 so as to swing the shovel to the position indicated at D'.

Inasmuch as the shovel is submerged when working, it would be impossible for the operator to know when the screen is covered with rock or coarse material. In the present instance an indicator disposed above water level on the frame D and in a position where it can be readily seen by the operator, is provided. This indicator is operated as follows: By referring to Figs. 2 and 3 it will be noted that one of the arms 67 is provided with a cam arm 67a. This engages a roller 67b secured on the lower end of a rod 67c which is square in cross section. The rod is extended up through the frame D and is held and guided by bearing sleeves secured in the cross-braces or arms of the frame. The upper end of the rod carries a pointer or indicator 67d and this moves over an indicating scale 67e (see Fig. 7). As the screen 47 becomes loaded with rock, and the arms 67 and shutter 66 move rearwardly, cam arms 67a gradually raises the rod, and the indicator thus moves upwardly over the indicating scale 67e, and by the position of the indicator with relation to the scale, the operator will know when the shovel is loaded with rock and ready to dump. The rod and the sleeves guiding the same are made square in cross section to prevent rotation of the roller with relation to the cam arm 67a, but a round rod with a spline may obviously be used. The shutter 66 is preferably connected with the arms 67 by a pivotal connection as shown at 67k, to permit it more readily to conform to the surface of the screen and also to prevent it from jamming in the event rocks or other foreign material should become interposed and a chain connection is made at 67m to limit pivotal movement, particularly when dumping.

During rearward movement of the shovel, and by particular reference to Fig. 4, it will be noted that the shovel is held in the position shown in Fig. 4 by means of a latch 68. This latch must be released when the shovel assumes the position D' so that it may be tilted to dump the rock. The release of the latch is accomplished automatically as it is connected through means of a link 69 with a pusher rod 70. The upper end of this rod is offset as at 71 and provided with a roller 72. When the swinging frame or arm 4 swings rearwardly to the position D', roller 72 will engage a shoe or plate 73 formed on the cross arm 3, and when it engages this plate it depresses the rod 70 and through link 69 swings the latch free of the shovel, thereby permitting the shovel to tilt rearwardly and to dump its contents. During the next forward movement, the roller 72 swings away from the plate 73 and the latch is accordingly free to fall behind the retaining shoulder and secure the shovel against rearward tilting movement. Roll 70 is spring actuated as indicated at 74 and is thus fully automatic in operation.

Forward tilting movement of the shovel must also be limited, and this is accomplished by securing angle brackets 75 on opposite sides of the shovel which engage the arms 4 and 5 of the frame to prevent a too great forward tilting of the shovel when it is being pulled forwardly by cable 54.

During actual operation the shovel is swung back and forth across the bottom of the pond or river in which it is operating, and as larger rock and coarse gravel piles up on the screen, the shutter 66 automatically moves rearwardly. All sand and fine gravel passes through the screen and with the water through the pipes previously described and is finally discharged into the sluice. All the finer minerals are also carried to the sluice but a certain percentage of the coarse minerals may lodge and stay in the chamber 63 of the shovel. The back and forward movement of the shovel will not throw out such minerals, as pockets 63a and 63b are formed at opposite ends of the chamber to retain any minerals that may be trapped. By referring to Figs. 3 and 5, it will be noted that the side of the shovel adjacent the suction element 15 is bulged outwardly as indicated at 77. This is to increase the area of the inlet to the elbow and to direct material into the same. In connection therewith, it might be stated that a booster nozzle 78 is employed. This passes through the hollow stud pin 9, previously referred to. A pipe 79 extends from the booster nozzle upwardly along the arm 4 and is then connected by means of a hose 80 with a pressure pump located at any convenient point on the dredge. A high pressure jet of water discharges from the nozzle 78 and assists in directing material into the suction end of the elbow. Also it acts in boosting such material upwardly through the pipe, and in the event that the priming on the pump is lost, the nozzle 78 will prime the pipe and pump, thus making the pump self-priming. The screen 47, through which the gravel is screened and washed, is arcuate to permit free swinging movement of the shutter 66. The screen is, however, removable as it is guided in channels formed in the side plates and is secured by flathead bolts 82 at the rear end. All edges are chamfered off to permit a smooth flow of gravel and to prevent the formation of any obstacles.

A shovel operated in the manner described remains submerged as long as it is digging or, in other words, is in operation. It need only be raised to the surface for inspection, cleaning, and repairs. The flow of water and gravel through it is continuous and, by connecting it with a suction pump of the character described, a liberal flow may be maintained at all times. Also by raising and lowering the cross beam 3, the suction head may be maintained at a minimum and the amount of power required to drive the pump is accordingly reduced. Friction losses in the suction pipes are also materially reduced due to the large curves provided at the points indicated at 12 and 24.

While the present invention has been more or less specifically described for purposes of illustration, I wish it understood that changes may be resorted to within the scope of the appended claims, and that the materials and finish may be such as the experience of the manufacturer may dictate and other conditions may demand.

Having thus described my invention, what I claim and desire to secure by Letters Patent is—

1. In a dredge of the character described a gallows frame, a pair of forwardly and downwardly extending arcuate guide tracks connected therewith, a pair of shoes slidably mounted one on each track, a cross beam connecting the shoes, means for raising or lowering the cross beam and shoes with relation to the gallows frame, a suction pump on the dredge, a suction pipe extending from the suction of the pump to the cross beam and supported thereby, a swivel connection at each end of the pipe to permit raising and lowering of the cross beam and shoes, a frame hung from the cross beam and free to swing therefrom, a shovel pivotally mounted at the lower end of the frame, and a suction pipe in the frame and having a swivel connection with the first named suction pipe at one end and with the shovel at the opposite end.

2. In a dredge of the character described a gallows frame, a pair of forwardly and downwardly extending arcuate guide tracks connected therewith, a pair of shoes slidably mounted one on each track, a cross beam connecting the shoes, means for raising or lowering the cross beam and shoes with relation to the gallows frame, a suction pump on the dredge, a suction pipe extending from the suction of the pump to the cross beam and supported thereby, a swivel connection at each end of the pipe to permit raising and lowering of the cross beam and shoes, a frame hung from the cross beam and free to swing therefrom, a shovel pivotally mounted at the lower end of the frame, a suction pipe in the frame and having a swivel connection with the first named suction pipe at one end and with the shovel at the opposite end, and means connected with the shovel for swinging it about its pivotal connection in the frame to assume different angular tilted positions, said means also adapted to swing the frame about its pivots in the cross beam to impart a back and forward digging movement to the shovel.

3. In a dredge of the character described a gallows frame, a pair of forwardly and downwardly extending arcuate guide tracks connected therewith, a pair of shoes slidably mounted one on each track, a cross beam connecting the shoes, means for raising or lowering the cross beam and shoes with relation to the gallows frame, a suction pump on the dredge, a suction pipe extending from the suction of the pump to the cross beam and supported thereby, a swivel connection at each end of the pipe to permit raising and lowering of the cross beam and shoes, a frame hung from the cross beam and free to swing therefrom, a shovel pivotally mounted at the lower end of the frame, a suction pipe in the frame and having a swivel connection with the first named suction pipe at one end and with the shovel at the opposite end, means connected with the shovel for swinging it about its pivotal connection in the frame to assume different angular tilted positions, said means also adapted to swing the frame about its pivots in the cross beam to impart a back-and-forward digging movement to the shovel, means normally locking the shovel against tilting movement in a rearward direction, and means for automatically releasing said lock when the shovel is swinging rearwardly to a dumping position.

4. In a dredge of the character described a gallows frame, a pair of forwardly and downwardly extending arcuate guide tracks connected therewith, a pair of shoes slidably mounted one on each track, a cross beam connecting the shoes, means for raising or lowering the cross beam and shoes with relation to the gallows frame, a suction pump on the dredge, a suction pipe extending from the suction of the pump to the cross beam and supported thereby, a swivel connection at each end of the pipe to permit raising and lowering of the cross beam and shoes, a frame hung from the cross beam and free to swing therefrom, a shovel pivotally mounted at the lower end of the frame, a suction pipe in the frame and having a swivel connection with the first named suction pipe at one end and with the shovel at the opposite end, means connected with the shovel for swinging it about its pivotal connection in the frame to assume different angular tilted positions, said means also adapted to swing the frame about its pivots in the cross beam to impart a back and forward digging movement to the shovel, means normally locking the shovel against tilting movement in a rearward direction, means for automatically releasing said lock when the shovel is swinging rearwardly to a dumping position, and a tailing conveyor extending under the dredge to receive and remove material dumped by the shovel when in dumping position.

5. In a dredge of the character described a gallows frame, a pair of forwardly and downwardly extending arcuate guide tracks connected therewith, a pair of shoes slidably mounted one on each track, a cross beam connecting the shoes, means for raising or lowering the cross beam and shoes with relation to the gallows frame, a suction pump on the dredge, a suction pipe extending from the suction of the pump to the cross beam and supported thereby, a swivel connection at each end of the pipe to permit raising and lowering of the cross beam and shoes, a frame hung from the cross beam and free to swing therefrom, a shovel pivotally mounted at the lower end of the frame, a suction pipe in the frame and having a swivel connection with the first named suction pipe at one end and with the shovel at the opposite end, means connected with the shovel for swinging it about its pivotal connection in the frame to assume different angular tilted positions, said means also adapted to swing the frame about its pivots in the cross beam to impart a back and forward digging movement to the shovel, means normally locking the shovel against tilting movement in a rearward direction, means for automatically releasing said lock when the shovel is swinging rearwardly to a dumping position, a tailing conveyor extending under the dredge to receive and remove material dumped by the shovel when in dumping position, and means for raising and lowering the tailing conveyor and for adjusting its angle with relation to the dredge.

6. In a dredge of the character described a gallows frame, a pair of forwardly and downwardly extending arcuate guide tracks connected therewith, a pair of shoes slidably mounted one on each track, a cross beam connecting the shoes, means for raising or lowering the cross beam and shoes with relation to the gallows frame, a suction pump on the dredge, a suction pipe extending from the suction of the pump to the cross beam and supported thereby, a swivel connection at each end of the pipe to permit raising and lowering of the cross beam and shoes, a frame hung from the cross beam and free to swing therefrom, a shovel pivotally mounted at the lower end of the frame, a suction pipe in the frame and having a swivel connection with the first named suction pipe at one end and with the shovel at the opposite end, said shovel having a screen covered chamber formed therein connected with the suction pipe to cause water to flow through sand and gravel scooped up by the shovel and deposited on the screen and to cause the finer materials to enter the chamber and suction pipe and coarse rock to be left on the screen, and a pivotally mounted shutter movable over the screen to increase or decrease the area of the screen in proportion to the amount of rock and gravel deposited on the screen.

7. In a dredge of the character described a gallows frame, a pair of forwardly and downwardly extending arcuate guide tracks connected therewith, a pair of shoes slidably mounted one on each track, a cross beam connecting the shoes, means for raising or lowering the cross beam and shoes with relation to the gallows frame, a suction pump on the dredge, a suction pipe extending from the suction of the pump to the cross beam and supported thereby, a swivel connection at each end of the pipe to permit raising and lowering of the cross beam and shoes, a frame hung from the cross beam and free to swing therefrom, a shovel pivotally mounted at the lower end of the frame, a suction pipe in the frame and having a swivel connection with the first named suction pipe at one end and with the shovel at the opposite end, and means in the shovel for directing material entering the shovel into the suction pipe connected therewith and for automatically priming the suction pipe and pump if the suction is broken.

8. In a dredge of the character described a gallows frame, a pair of forwardly and downwardly extending arcuate guide tracks connected therewith, a pair of shoes slidably mounted one on each track, a cross beam connecting the shoes, means for raising or lowering the cross beam and shoes with relation to the gallows frame, a suction pump on the dredge, a suction pipe extending from the suction of the pump to the cross beam and supported thereby, a swivel connection at each end of the pipe to permit raising and lowering of the cross beam and shoes, a frame hung from the cross beam and free to swing therefrom, a shovel pivotally mounted at the lower end of the frame, a suction pipe in the frame and having a swivel connection with the first named suction pipe at one end and with the shovel at the opposite end, and a high pressure nozzle extending crosswise of the shovel to direct a stream of water into the suction pipe connected with the shovel and to automatically prime the suction pipe and pump if the suction is broken.

9. In a dredge of the character described a gallows frame, a vertically adjustable cross beam supported thereby, a frame pivoted at its upper end to the cross beam, a shovel pivotally mounted in the lower end of the frame, means connected with the shovel for swinging the frame and shovel back and forth and for controlling angular tilt of the shovel in a forward direction, means normally locking the shovel against tilting in a rearward direction, means for automatically releasing the lock to permit rearward tilting of the shovel when it is swinging rearwardly to a dumping position, and a tailing conveyor extending under the dredge to receive material dumped by the shovel.

10. In a dredge of the character described a frame pivoted at its upper end, a shovel pivoted at the lower end of the frame, means for raising and lowering the frame and shovel, means for imparting a swinging movement to the frame and shovel to cause the shovel to dig into material to be removed during forward swinging movement, and to permit dumping of coarse material during rearward swinging movement, a suction chamber formed in the shovel, a screen covering the chamber, a suction pump on the dredge, an articulated suction pipe connected at one end with the suction of the pump and at the opposite end with the suction chamber of the shovel to cause water to flow through material deposited on the screen and to remove fine materials, a discharge pipe on the pump to deliver water and fine materials to a sluice box, and a shutter movable over the surface of the screen to vary the area of the screen in proportion to the amount of material deposited on the screen.

11. In a dredge of the character described a frame pivoted at its upper end, a shovel pivoted at the lower end of the frame, means for raising and lowering the frame and shovel, means for imparting a swinging movement to the frame and shovel to cause the shovel to dig into material to be removed during forward swinging movement, and to permit dumping of coarse material during rearward swinging movement, a suction chamber formed in the shovel, a screen covering the chamber, a suction pump on the dredge, an articulated suction pipe connected at one end with the suction of the pump and at the opposite end with the suction chamber of the shovel to cause water to flow through material deposited on the screen and to remove fine materials, a discharge pipe on the pump to deliver water and fine materials to a sluice box, a shutter movable over the surface of the screen to vary the area of the screen in proportion to the amount of material deposited on the screen, and means carried by the shovel for automatically priming the pump and articulated suction pipe if the suction is broken.

12. In a dredge of the character described a frame pivoted at its upper end, a shovel pivoted at the lower end of the frame, means for raising and lowering the frame and shovel, means for imparting a swinging movement to the frame and shovel to cause the shovel to dig into material to be removed during forward swinging movement, and to permit dumping of coarse material during rearward swinging movement, a suction chamber formed in the shovel, a screen covering the chamber, a suction pump on the dredge, an articulated suction pipe connected at one end with the suction of the pump and at the opposite end with the suction chamber of the shovel to cause water to flow through material deposited on the screen and to remove fine materials, a discharge pipe on the pump to deliver water and fine materials to a sluice box, a shutter movable over the surface of the screen to vary the area of the screen in proportion to the amount of material deposited on the screen, and means for visibly indicating the position of the shutter with relation to the screen.

13. In a dredge of the character described a gallows frame, a vertically adjustable cross beam supported thereby, a frame pivoted at its upper end to the cross beam, a shovel pivotally mounted in the lower end of the frame, means connected with the shovel for swinging the frame and shovel back and forth and for controlling angular tilt of the shovel in a forward direction, means normally locking the shovel against tilting in a rearward direction, and means for automatically releasing the lock to permit rearward tilting of the shovel when it is swinging rearwardly to a dumping position.

14. In a dredge of the character described a gallows frame, a pair of forwardly and downwardly extending arcuate guide tracks connected therewith, a pair of shoes slidably mounted one on each track, a cross beam connecting the shoes, means for raising or lowering the cross beam and shoes with relation to the gallows frame, a suction pump on the dredge, a suction pipe extending from the suction of the pump to the cross beam and supported thereby, a swivel connection at each end of the pipe to permit raising and lowering of the cross beam and shoes, a frame hung from the cross beam and free to swing therefrom, a shovel pivotally mounted at the lower end of the frame, a suction pipe in the frame and having a swivel connection with the first named suction pipe at one end and with the shovel at the opposite end, said shovel having a screen covered chamber formed therein connected with the suction pipe to cause water to flow through sand and gravel scooped up by the shovel and deposited on the screen and to cause the finer materials to enter the chamber and suction pipe and coarse rock to be left on the screen, a pivotally mounted shutter movable over the screen to increase or decrease the area of the screen in proportion to the amount of rock and gravel deposited on the screen, and means for visibly indicating the position of the shutter with relation to the screen.

ISAAC PETERSON.